(12) United States Patent
Garcia

(10) Patent No.: US 7,985,283 B2
(45) Date of Patent: Jul. 26, 2011

(54) SYSTEM FOR DE-AERATING A HYDRAULIC FLUID IN A TRANSMISSION

(75) Inventor: Pete R Garcia, Canton, MI (US)

(73) Assignee: Gm Global Technology Operations LLC, Detroit, MI (US)

( * ) Notice: Subject to any disclaimer, the term of this patent is extended or adjusted under 35 U.S.C. 154(b) by 648 days.

(21) Appl. No.: 12/099,995

(22) Filed: Apr. 9, 2008

(65) Prior Publication Data

US 2009/0255223 A1 Oct. 15, 2009

(51) Int. Cl.
*B01D 19/00* (2006.01)

(52) U.S. Cl. .......................................... 96/211; 184/6.23

(58) Field of Classification Search .................... 96/211, 96/209, 210, 212; 95/261; 184/6.23, 6.24
See application file for complete search history.

(56) References Cited

U.S. PATENT DOCUMENTS

| | | | | |
|---|---|---|---|---|
| 2,024,336 | A * | 12/1935 | Cavanaugh | 184/6.23 |
| 6,719,096 | B2 * | 4/2004 | Mogi | 184/6.23 |
| 7,105,044 | B2 * | 9/2006 | Konishi et al. | 96/208 |
| 7,288,138 | B2 * | 10/2007 | Showalter et al. | 96/1 |
| 7,288,139 | B1 * | 10/2007 | Showalter | 96/1 |
| 2002/0007736 | A1 * | 1/2002 | Hearn et al. | 96/209 |
| 2003/0098204 | A1 * | 5/2003 | Mogi | 184/6.23 |
| 2005/0284299 | A1 * | 12/2005 | Lane et al. | 96/209 |
| 2007/0163442 | A1 * | 7/2007 | Saito et al. | 96/209 |

* cited by examiner

*Primary Examiner* — Duane Smith
*Assistant Examiner* — Douglas J Theisen

(57) ABSTRACT

A system for at least partially de-aerating a hydraulic fluid in a transmission includes a plurality of transmission components, a first reservoir for receiving de-aerated hydraulic fluid, a first pump in communication with the first reservoir and operable to pump the de-aerated hydraulic fluid to the plurality of transmission components, a second reservoir for receiving aerated hydraulic fluid from the plurality of transmission components, a second pump in communication with the second reservoir and operable to pump the aerated hydraulic fluid from the second reservoir, and a separator for receiving the aerated hydraulic fluid from the second pump and operable to de-aerate the aerated hydraulic fluid and communicate the de-aerated hydraulic fluid to the first reservoir.

19 Claims, 2 Drawing Sheets

SYSTEM FOR DE-AERATING A HYDRAULIC FLUID IN A TRANSMISSION

FIELD

The invention relates generally to a de-aeration system in a transmission, and more particularly to a system having a dual two-phase cyclonic separator operable to de-aerate hydraulic fluid in a transmission.

BACKGROUND

The statements in this section merely provide background information related to the present disclosure and may or may not constitute prior art.

A conventional automatic transmission includes a hydraulic system operable to circulate a hydraulic fluid, such as an oil, throughout the transmission. The hydraulic fluid provides multiple functions to the components of the transmission including, but not limited to, lubrication of the clutches and gearsets, cooling of components that generate excessive heat, and hydraulic control of valves, solenoids, and clutch pistons. However, typical hydraulic fluids employed in transmissions are susceptible to being entrained with air (i.e., aerated). Air does not lubricate nor provide cooling as effectively as the hydraulic fluid. Accordingly, although the requisite volume of oil is seemingly being pumped to provide sufficient cooling and lubrication to the transmission, the lubrication and cooling is insufficient. As a consequence, the components of the transmission may overheat and bearings and other moving parts may prematurely fail. Additionally, it can lead to pump cavitations and excessive softness in hydraulically actuated components. The hydraulic fluid in the transmission may become aerated in various parts of the system since the system is not sealed from the environment. Additionally, the sump that stores the hydraulic fluid typically contains air.

One solution to account for aeration is to increase the amount of hydraulic fluid communicated throughout the system. However, this solution increases the cost and weight of the system. Accordingly, there is a need in the art for a system that de-aerates hydraulic fluid as it is communicated throughout the transmission in order to reduce the volume of hydraulic fluid needed, increase lubrication and cooling, eliminate pump cavitation and soft hydraulic control actuation without substantially increasing cost and weight.

SUMMARY

The present invention provides a system for at least partially de-aerating a hydraulic fluid in a transmission. The system includes a plurality of transmission components, a first reservoir for receiving de-aerated hydraulic fluid, a first pump in communication with the first reservoir and operable to pump the de-aerated hydraulic fluid to the plurality of transmission components, a second reservoir for receiving aerated hydraulic fluid from the plurality of transmission components, a second pump in communication with the second reservoir and operable to pump the aerated hydraulic fluid from the second reservoir, and a separator for receiving the aerated hydraulic fluid from the second pump and operable to de-aerate the aerated hydraulic fluid and communicate the de-aerated hydraulic fluid to the first reservoir.

In one aspect of the present invention, the separator is located within the first reservoir.

In another aspect of the present invention, the separator is located in an upper portion of the first reservoir.

In yet another aspect of the present invention, the separator is a dual-phase cyclonic separator.

In yet another aspect of the present invention, the separator includes an inlet port in communication with the second pump for receiving the aerated hydraulic fluid and at least one outlet port for communicating the aerated hydraulic fluid to the first reservoir.

In yet another aspect of the present invention, the separator further includes a first cyclonic separator and a second cyclonic separator in communication with the inlet port and the outlet port.

In yet another aspect of the present invention, the first and second cyclonic separators share a common housing.

In yet another aspect of the present invention, the housing includes a first channel that communicates from the inlet port to the first cyclonic separator and a second channel that communicates from the inlet port to the second cyclonic separator.

In yet another aspect of the present invention, the first and second channels are tapered to increase centrifugal acceleration of the hydraulic fluid through the separator.

In yet another aspect of the present invention, the first and second channels include a plurality of flow holes for increasing the rate of de-aeration of the hydraulic fluid within the first and second cyclonic separators.

In yet another aspect of the present invention, the system further includes a third reservoir for receiving aerated hydraulic fluid from the plurality of transmission components, and the second pump is operable to pump aerated hydraulic fluid from the third reservoir to the separator.

In yet another aspect of the present invention, the plurality of transmission components include a plurality of gearsets that communicate the aerated hydraulic fluid to the second reservoir and a dual clutch assembly that communicates the aerated hydraulic fluid to the third reservoir.

Another embodiment of the system for at least partially de-aerating a hydraulic fluid in a transmission includes a plurality of transmission components, a first reservoir for receiving de-aerated hydraulic fluid, a first pump in communication with the first reservoir and operable to pump the de-aerated hydraulic fluid to the plurality of transmission components, a second reservoir for receiving aerated hydraulic fluid from the plurality of transmission components, a second pump in communication with the second reservoir and operable to pump the aerated hydraulic fluid from the second reservoir, and a separator. The separator includes an inlet port for receiving the aerated hydraulic fluid from the second pump, a first spiral channel in communication with the inlet port, the first spiral channel operable to de-aerate the aerated hydraulic fluid, a second spiral channel in communication with the inlet port, the second spiral channel operable to de-aerate the aerated hydraulic fluid, a first outlet port for receiving the de-aerated hydraulic fluid from the first spiral channel and for communicating the de-aerated hydraulic fluid to the first reservoir, and a second outlet port for receiving the de-aerated hydraulic fluid from the second spiral channel and for communicating the de-aerated hydraulic fluid to the first reservoir.

In one aspect of the present invention, the separator is located within the first reservoir.

In another aspect of the present invention, the separator is located in an upper portion of the first reservoir.

In yet another aspect of the present invention, the separator includes a housing that defines a first channel and a second channel, and the first channel communicates from the inlet port to the first spiral channel and the second channel communicates from the inlet port to the second spiral channel.

In yet another aspect of the present invention, the first and second channels are tapered to increase centrifugal acceleration of the hydraulic fluid through the separator.

In yet another aspect of the present invention, the first channel, the second channel, the first spiral channel, and the second spiral channel each include at least one flow hole for increasing the rate of de-aeration of the hydraulic fluid within the separator.

In yet another aspect of the present invention, the system further includes a third reservoir for receiving aerated hydraulic fluid from the plurality of transmission components, and wherein the second pump is operable to pump aerated hydraulic fluid from the third reservoir to the separator.

In yet another aspect of the present invention, the plurality of transmission components include a plurality of gearsets that communicate the aerated hydraulic fluid to the second reservoir and a dual clutch assembly that communicates the aerated hydraulic fluid to the third reservoir.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
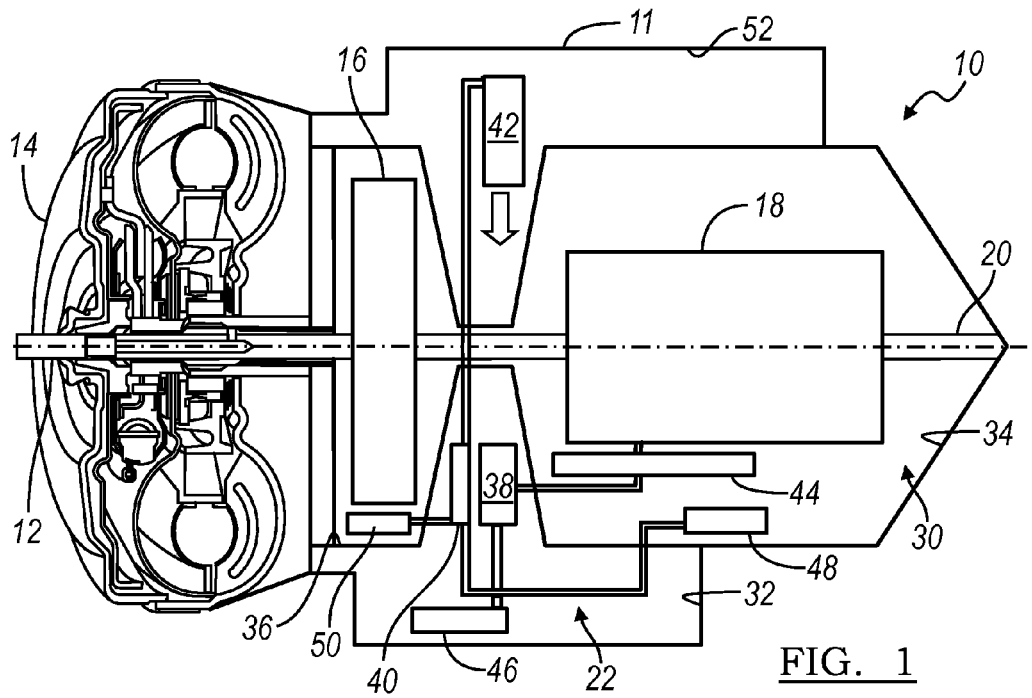
FIG. 1 is a schematic diagram of an exemplary transmission having a system for de-aerating and communicating a hydraulic fluid according to the principles of the present invention.

With reference to FIG. 1, an exemplary transmission is illustrated and indicated by reference number 10. The transmission 10 is an automatic transmission that generally includes a housing 11 that encloses an input shaft or member 12, a torque converter 14, a dual clutch assembly 16, a plurality of gear sets 18, an output shaft or member 20, and a hydraulic system 22. The input shaft 12 is connected to the torque converter 14 and to a prime mover (not shown), for example a combustion or electric engine. The input shaft 12 receives an input torque from the prime mover and communicates the input torque to the torque converter 14. The torque converter 14 is coupled to the dual clutch assembly 16 and is operable to transmit the input torque to the dual clutch assembly 16. The dual clutch assembly is coupled to the plurality of gear sets 18. The dual clutch assembly 16 and the plurality of gear sets 18 cooperate to provide a plurality of forward and reverse speed or gear ratios to the output shaft 20. The output shaft 20 is in turn coupled to a final drive unit or transfer case (not shown). It should be appreciated that the exemplary transmission 10 may include various other components without departing from the scope of the present invention. Additionally, it should be appreciated that the exemplary transmission 10 may have fewer components than illustrated without departing from the scope of the present invention.

The hydraulic system 22 is operable to de-aerate and communicate a hydraulic fluid, such as an oil, throughout the transmission 10 in order to provide cooling, lubrication, and control to at least the dual clutch assembly 16 and the plurality of gear sets 18, as will be described in greater detail below. The hydraulic system 22 includes a hydraulic circuit 30, a first reservoir 32, a second reservoir 34, a third reservoir 36, a first pump 38, a second pump 40, and a separator 42.

The hydraulic circuit 30 is a general designation for a circuit operable to deliver the hydraulic fluid throughout the components of the transmission 10 in order to provide lubrication, cooling, and control. Accordingly, the hydraulic circuit 30 includes a control valve body assembly 44 and a plurality of channels and passageways (not shown) that communicate with the plurality of gear sets 18 and the dual clutch assembly 16, as well as other interconnecting shafts and members (not shown) within the transmission 10. The control valve body assembly 44 houses a plurality of valves, solenoids, and passageways operable to control the engagement of the dual clutch assembly 16 and the lubrication and cooling of the dual clutch assembly 16 and the plurality of gear sets 18.

The first reservoir 32 is a sump or tank for storing at least partially de-aerated hydraulic fluid. The de-aerated hydraulic fluid is hydraulic fluid that has been de-aerated to an extent compatible with the hydraulic requirements of the transmission 10. The first reservoir 32 is located between the second and third reservoirs 34, 36. The second reservoir 34 is a sump or tank for collecting at least partially aerated hydraulic fluid from the plurality of gear sets 18. Aerated hydraulic fluid is hydraulic fluid having air or other gasses entrained within the hydraulic fluid to an extent that is incompatible or undesirable with the hydraulic requirements of the transmission 10. The second reservoir 34 is separate from the first reservoir 32 and is located near a rear of the transmission 10 proximate the output shaft 20. The third reservoir 36 is a sump or tank for collecting at least partially aerated hydraulic fluid from the dual clutch assembly 16. The third reservoir 36 is also separate from the first and second reservoirs 32, 34 and is located near a front of the transmission 10 proximate the dual clutch assembly 16.

The first pump 38, or main pump, may take many forms, such as, for example, a crescent pump, an impeller pump, gear pump, or vane pump, without departing from the scope of the present invention. The first pump 38 is in communication with a first filter 46 located within the first reservoir 32 and is in communication with the hydraulic circuit 30. The first filter 46 is operable to remove particulates from hydraulic fluid exiting the first reservoir 32 via the first pump 38. The first pump 38 is operable to pump the hydraulic fluid from the first reservoir 32 to the hydraulic circuit 30, as will be described in further detail below.

The second pump 40, or scavenger pump, may take many forms, such as, for example, a crescent pump, an impeller pump, gear pump, or vane pump, without departing from the scope of the present invention. The second pump 40 is in communication with a second filter 48 located within the second reservoir 34, with a third filter 50 located within the third reservoir 36, and with the separator 42. The second filter 48 is operable to remove particulates from hydraulic fluid exiting the second reservoir 34 via the second pump 40 and the third filter 50 is operable to remove particulates from hydraulic fluid exiting the third reservoir 36 via the second pump 40. The second pump 40 is operable to pump the hydraulic fluid from the second reservoir 34 and the third reservoir 36 to the separator 42, as will be described in further detail below.

Figure 2:
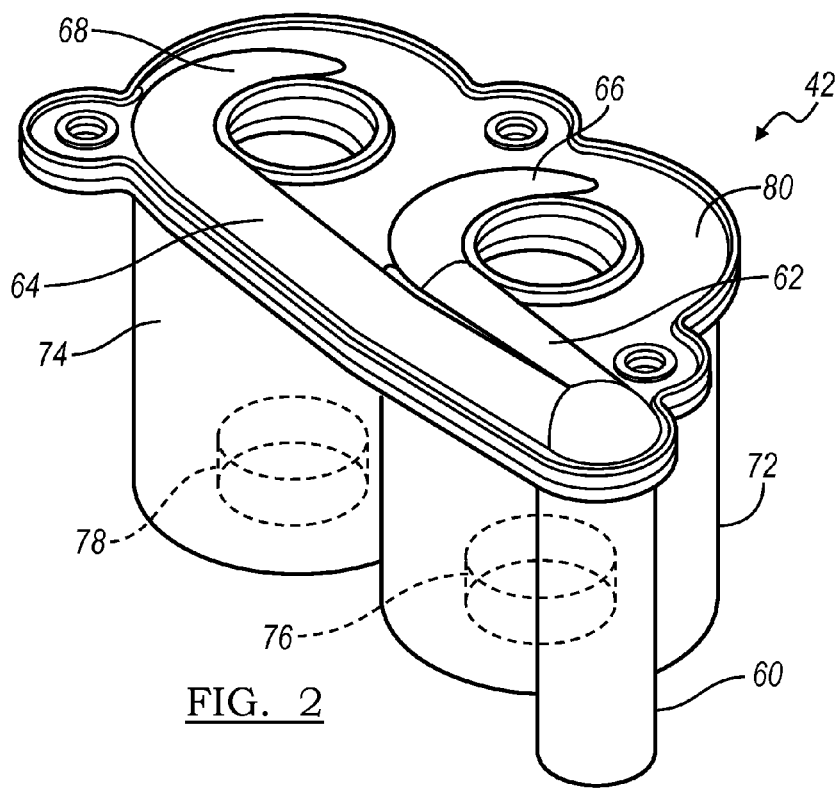
FIG. 2 is a perspective view of an embodiment of a dual separator used in the system of the present invention.
Figure 3:
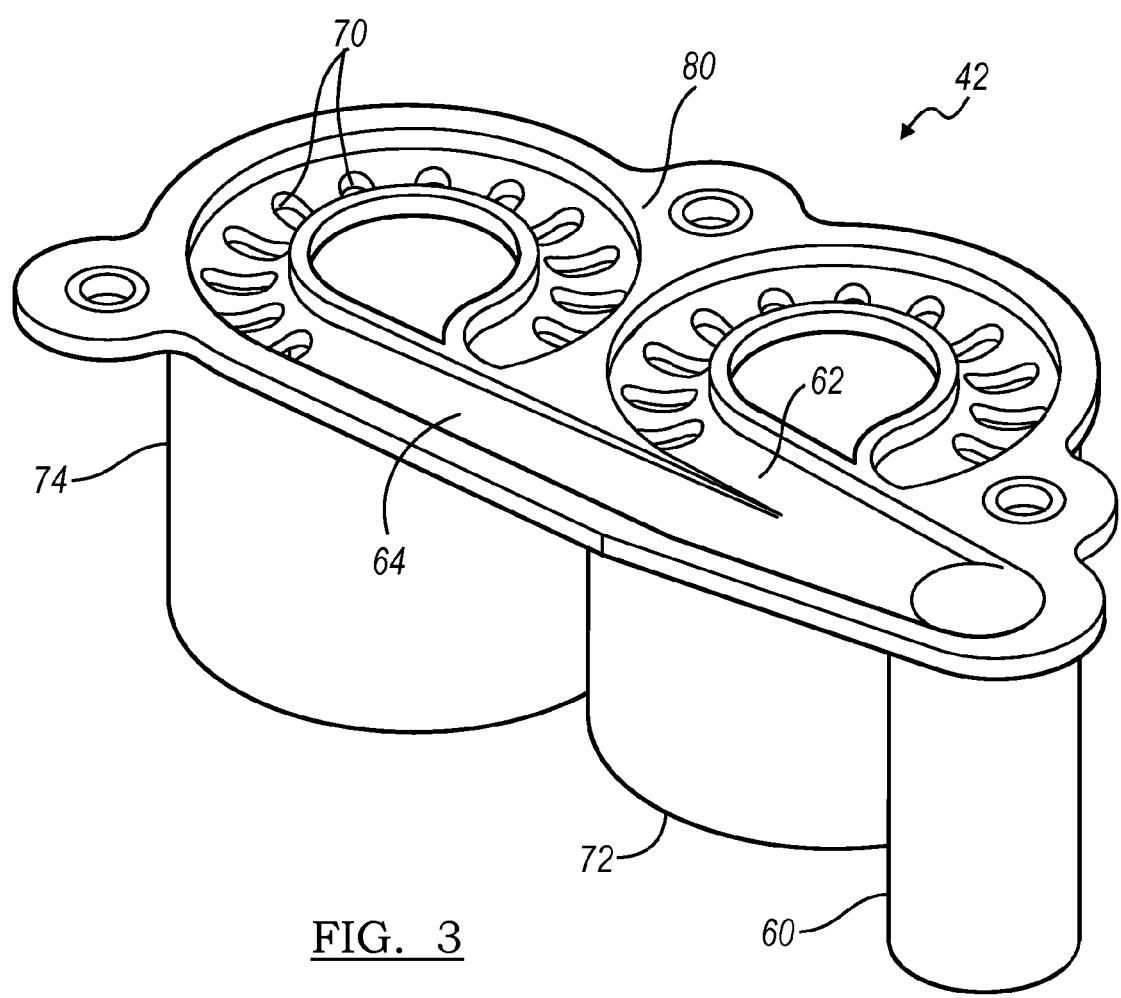
FIG. 3 is a perspective view of an embodiment of the dual separator with a top portion removed.

The separator 42 is operable to at least partially de-aerate the aerated hydraulic fluid delivered by the second pump 40 from the second and third reservoirs 34, 36. Preferably, the separator 42 is located in an upper portion 52 of the first reservoir 32. Turning to FIG. 2, the separator 42 is preferably a dual two phase cyclonic separator that includes an input port 60 in communication with the second pump 40 for receiving the hydraulic fluid pumped from the second pump 40. The input port 60 is connected to a first channel 62 and a second channel 64. The first and second channels 62, 64 each include tapered end portions 66, 68, respectively, operable to increase the velocity or flow of the hydraulic fluid through the first and second channels 62, 64. As shown in FIG. 3, the first and second channels 62, 64 each include a plurality of cold-flow holes 70 operable to increase the flow of hydraulic fluid through the separator 42. However, it should be appreciated that the first and second channels 62, 64 may have any number of cold-flow holes 70 or no cold flow holes without departing from the scope of the present invention.

Returning to FIG. 2, the first channel 62 communicates with a first cyclonic separator 72. The first cyclonic separator 72 is operable to use centrifugal forces to separate air or other gasses from the hydraulic fluid as the hydraulic fluid flows through a spiral channel (not shown) within the first cyclonic separator 72. The first cyclonic separator 72 is in communication with a first outlet port 76 located on a bottom surface of the first cyclonic separator 72. The first outlet port 76 is in communication with the first reservoir 32 (FIG. 1) and communicates the de-aerated hydraulic fluid back to the first reservoir 32.

The second channel 64 communicates with a second cyclonic separator 74. The second cyclonic separator 74 is operable to use centrifugal forces to separate air or other gasses from the hydraulic fluid as the hydraulic fluid flows through a spiral channel (not shown) within the second cyclonic separator 74. The second cyclonic separator 74 is in communication with a second outlet port 78 located on a bottom surface of the second cyclonic separator 74. The second outlet port 78 is in communication with the first reservoir 32 (FIG. 1) and communicates the de-aerated hydraulic fluid back to the first reservoir 32.

In the present embodiment, the first and second cyclonic separators 72, 74 are formed as a single integrated unit sharing a common housing 80. By integrating two cyclonic separators 72, 74, the rate of hydraulic fluid de-aeration is increased.

With combined reference to FIGS. 1-3, the operation of the hydraulic system 22 will now be described. Hydraulic fluid stored within the first reservoir 32 is pumped by the first pump 38 to the hydraulic circuit 30. The hydraulic fluid is communicated through the valve body 44 and delivered to the dual clutch assembly 16 and the plurality of gear sets 18 to provide lubrication, cooling, and control. Hydraulic fluid used within the plurality of gear sets 18 drains from the plurality of gear sets 18 and is collected within the second reservoir 34. Likewise, hydraulic fluid used within the dual clutch assembly 16 drains from the dual clutch assembly 16 and is collected within the third reservoir 36.

As this point during operation of the hydraulic system 22, is possible that the hydraulic fluid within the second and third reservoirs 34, 36 has become at least partially aerated by air within the system 22. The aerated hydraulic fluid is then pumped from the second and third reservoirs 34, 36 by the second pump 38 and delivered to the separator 42. The separator 42 separates the air from the hydraulic fluid, as described above. The de-aerated hydraulic fluid is then communicated back to the first reservoir 32 from the separator 42, and the cycle continues.

The description of the invention is merely exemplary in nature and variations that do not depart from the gist of the invention are intended to be within the scope of the invention. Such variations are not to be regarded as a departure from the spirit and scope of the invention.

I claim the following:

1. A system for at least partially de-aerating a hydraulic fluid in a transmission, the system comprising:
    a plurality of transmission components;
    a first reservoir for receiving de-aerated hydraulic fluid;
    a first pump in communication with the first reservoir and operable to pump the de-aerated hydraulic fluid to the plurality of transmission components;
    a second reservoir for receiving aerated hydraulic fluid from the plurality of transmission components;
    a third reservoir for receiving aerated hydraulic fluid from the plurality of transmission components;
    a second pump in communication with the second reservoir and the third reservoir and operable to pump the aerated hydraulic fluid from the second reservoir and from the third reservoir; and
    a separator for receiving the aerated hydraulic fluid from the second pump and operable to de-aerate the aerated hydraulic fluid and communicate the de-aerated hydraulic fluid to the first reservoir.

2. The system of claim 1 wherein the separator is located within the first reservoir.

3. The system of claim 2 wherein the separator is located in an upper portion of the first reservoir.

4. The system of claim 1 wherein the separator is a dual-phase cyclonic separator.

5. The system of claim 1 wherein the separator includes an inlet port in communication with the second pump for receiving the aerated hydraulic fluid and at least one outlet port for communicating the de-aerated hydraulic fluid to the first reservoir.

6. The system of claim 5 wherein the separator further includes a first cyclonic separator and a second cyclonic separator in communication with the inlet port and the outlet port.

7. The system of claim 6 wherein the first and second cyclonic separators share a common housing.

8. The system of claim 7 wherein the housing includes a first channel that communicates from the inlet port to the first cyclonic separator and a second channel that communicates from the inlet port to the second cyclonic separator.

9. The system of claim 8 wherein the first and second channels are tapered to increase centrifugal acceleration of the hydraulic fluid through the separator.

10. The system of claim 8 wherein the first and second channels include a plurality of flow holes for increasing the rate of de-aeration of the hydraulic fluid within the first and second cyclonic separators.

11. The system of claim 1 wherein the plurality of transmission components include a plurality of gearsets that communicate the aerated hydraulic fluid to the second reservoir and a dual clutch assembly that communicates the aerated hydraulic fluid to the third reservoir.

12. A system for at least partially de-aerating a hydraulic fluid in a transmission, the system comprising:
    a plurality of transmission components;
    a first reservoir for receiving de-aerated hydraulic fluid;

a first pump in communication with the first reservoir and operable to pump the de-aerated hydraulic fluid to the plurality of transmission components;

a second reservoir for receiving aerated hydraulic fluid from the plurality of transmission components;

a second pump in communication with the second reservoir and operable to pump the aerated hydraulic fluid from the second reservoir; and a separator comprising:
 an inlet port for receiving the aerated hydraulic fluid from the second pump;
 a first spiral channel in communication with the inlet port and having at least one flow hole disposed therein, the first spiral channel operable to de-aerate the aerated hydraulic fluid;
 a second spiral channel in communication with the inlet port and having at least one flow hole disposed therein, the second spiral channel operable to de-aerate the aerated hydraulic fluid;
 a first outlet port for receiving the de-aerated hydraulic fluid from the first spiral channel and for communicating the de-aerated hydraulic fluid to the first reservoir; and
 a second outlet port for receiving the de-aerated hydraulic fluid from the second spiral channel and for communicating the de-aerated hydraulic fluid to the first reservoir.

13. The system of claim 12 wherein the separator is located within the first reservoir.

14. The system of claim 13 wherein the separator is located in an upper portion of the first reservoir.

15. The system of claim 14 wherein the separator includes a housing that defines a first channel and a second channel, and wherein the first channel communicates from the inlet port to the first spiral channel and the second channel communicates from the inlet port to the second spiral channel.

16. The system of claim 15 wherein the first and second channels are tapered to increase centrifugal acceleration of the hydraulic fluid through the separator.

17. The system of claim 16 wherein the first channel and the second channel each include at least one flow hole for increasing the rate of de-aeration of the hydraulic fluid within the separator.

18. The system of claim 17 further comprising a third reservoir for receiving aerated hydraulic fluid from the plurality of transmission components, and wherein the second pump is operable to pump aerated hydraulic fluid from the third reservoir to the separator.

19. The system of claim 18 wherein the plurality of transmission components include a plurality of gearsets that communicate the aerated hydraulic fluid to the second reservoir and a dual clutch assembly that communicates the aerated hydraulic fluid to the third reservoir.

\* \* \* \* \*